United States Patent [19]

Huffman

[11] 4,355,660

[45] Oct. 26, 1982

[54] PNEUMATICALLY CONTROLLED, FOUR POSITION HYDRAULIC VALVE

[75] Inventor: Theron M. Huffman, Paw Paw, Mich.

[73] Assignee: General Signal Corporation, Stamford, Conn.

[21] Appl. No.: 140,519

[22] Filed: Apr. 15, 1980

[51] Int. Cl.$^3$ .............................................. F16K 11/07

[52] U.S. Cl. ................................ 137/625.63; 91/464; 137/625.66; 251/297

[58] Field of Search ....................... 137/625.63, 625.66, 137/625.69; 91/464; 251/297

[56] References Cited

U.S. PATENT DOCUMENTS

| | | | |
|---|---|---|---|
| 2,831,466 | 4/1958 | Stueland | 91/451 |
| 3,106,135 | 10/1963 | McAfee, Jr. et al. | 137/625.69 X |
| 3,120,858 | 2/1964 | Markovich | 137/625.69 |
| 3,160,174 | 12/1964 | Schmiel et al. | 137/625.63 |
| 3,346,012 | 10/1967 | Williams | 137/625.69 |
| 3,641,876 | 2/1972 | Wienke | 91/461 X |
| 3,866,880 | 2/1975 | Schexnayder | 251/297 |
| 3,939,870 | 2/1976 | Giugliano | 137/625.6 X |
| 4,154,262 | 5/1979 | Blume et al. | 91/464 |
| 4,182,534 | 1/1980 | Snyder | 137/596.14 X |

*Primary Examiner*—Robert G. Nilson
*Attorney, Agent, or Firm*—Thomas R. FitzGerald; Jeffrey S. Mednick; Perry Palan

[57] ABSTRACT

A four position hydraulic valve having a first power, a hold, a float, and a second power position is adapted for pneumatic control by enclosing the ends of the power spool in pneumatic chambers. A three position pneumatic valve having its two output ports connected respectively to the pneumatic chambers, drives the power spool from the hold position to either power position and from the float position to the hold position. A detent retains the powers spool in the float position after a second power position and a centering spring biases the power spool toward the hold position from either power position and the float position.

10 Claims, 6 Drawing Figures

FIG. 4
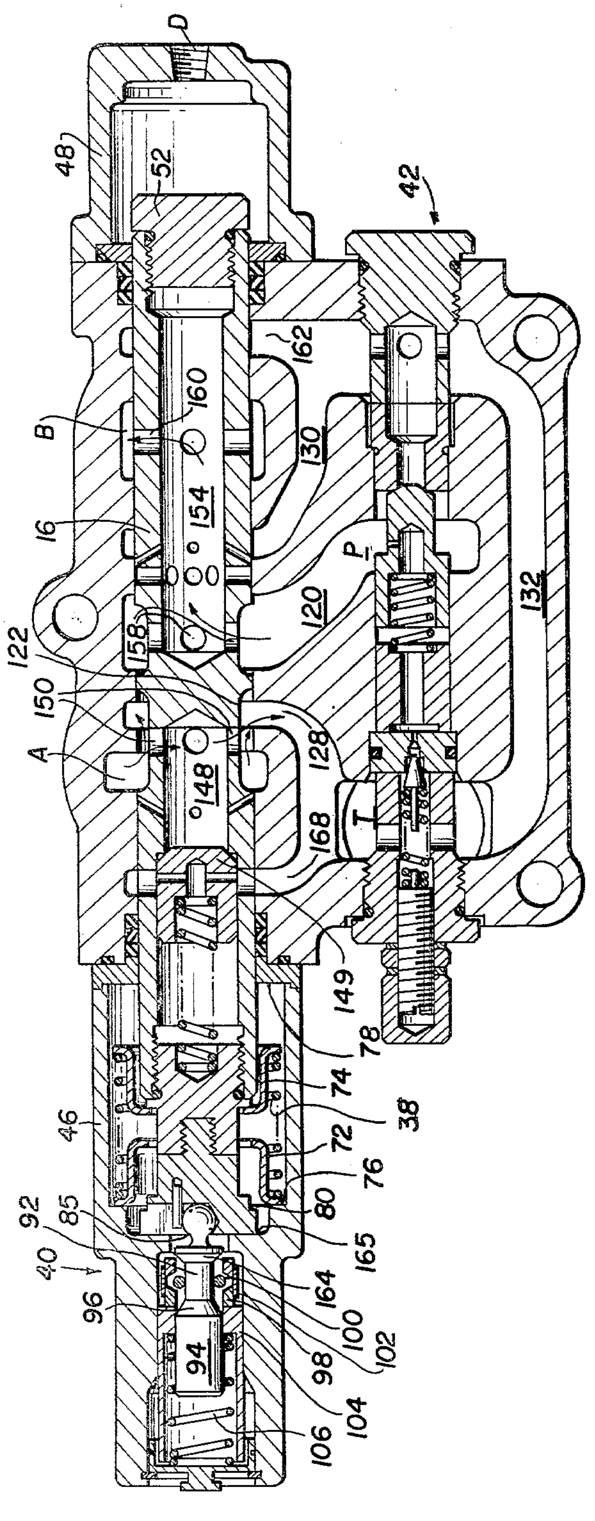
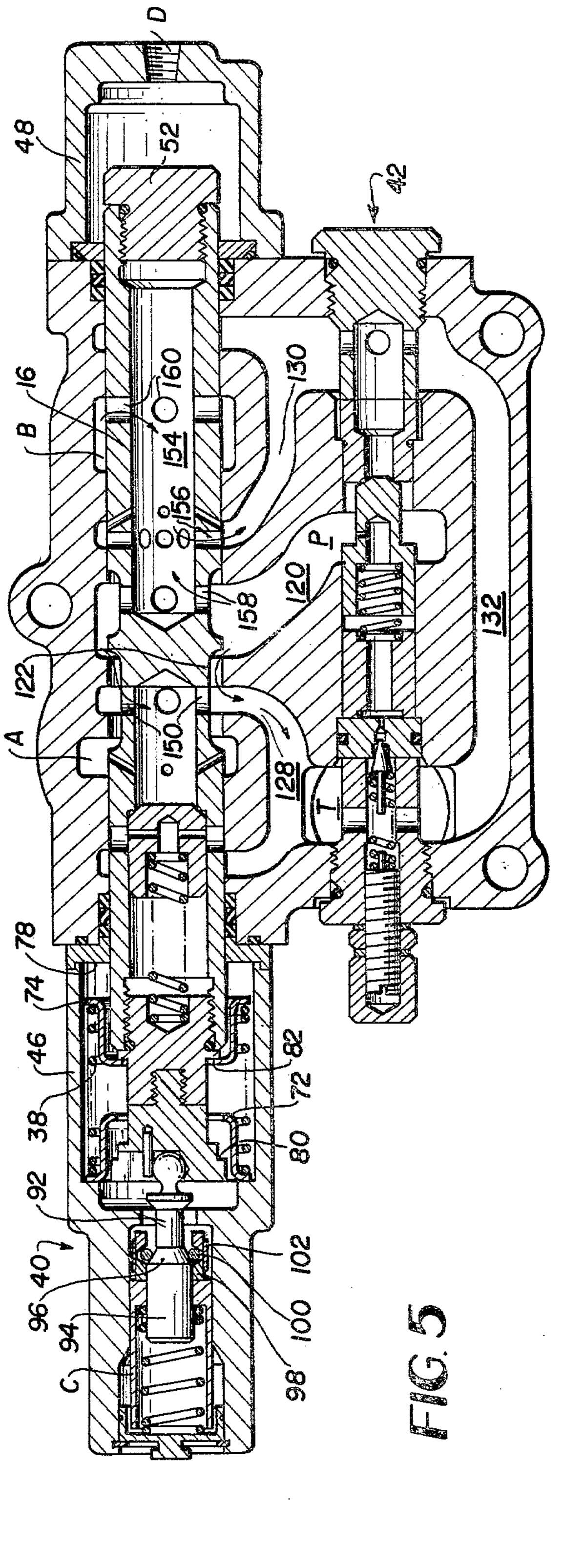
FIG. 5

PNEUMATICALLY CONTROLLED, FOUR POSITION HYDRAULIC VALVE

BACKGROUND OF THE INVENTION

The present invention relates generally to hydraulic valves and more particularly to a pneumatically controlled hydraulic valve.

Hydraulic systems for hydraulic hoist cylinders are well known and generally include a four position hydraulic valve including a raised position, a neutral or hold position, a lower position and one or more float positions. In the raised position, hydraulic fluid is connected from the pump through the valve to a first side of the cylinder while the second side of the cylinder is being evacuated. In the lower position, which is on the other side of the neutral or hold position, hydraulic fluid is provided from the pump to the second side of the cylinder while the first side is being evacuated or returned to the reservoir. In the float position which is on the same side of hold or neutral as the lower position, both sides of the cylinder are connected to each other and/or the reservoir so that the cylinder will lower under its own weight instead of being reversibly driven by hydraulic pressure. In the neutral or hold position, both sides of the cylinder are sealed, locking the cylinder in its last position. Many different four way valves have been designed to prevent cavitation during the float position.

The need for a control system having a power down or lower mode and a float down or lower mode will be explained for dump trucks having a hydraulic cylinder fixed between the truck bed and a dump body which is pivotally connected to the truck bed. The power down position is needed because the dump body can be raised past its center of gravity, and thus, a float type or non-driven down system will not lower the dump body to the bed from the over center position.

Usually, it is desirable for the hydraulic valve to automatically assume a float position after the lower position. The lack of a float position requires that the operator of the system pay special attention to the position of the dump body in order to avoid unnecessary loading of the hoist cylinder. If the power spool is shifted to the neutral or hold position before the body comes to rest on the truck bed, then the entire weight of the body will be carried by the hydraulic cylinder. Such premature shifting occurs frequently and can shorten the useful life of the hydraulic components.

Typical examples of valves having the float position between the neutral and power down are shown in U.S. Pat. Nos. 2,831,466 and 3,120,858. Both of these patents have manually operated hydraulic valves. For high pressure systems operating at approximately a 100 gallon per minute flow rate, the fluid creates significant flow forces on the valve and thus manual operation of the valve is difficult. Similarly, since the valve is frequently mounted directly on the reservoir to facilitate return line plumbing, the resulting linkage is often complicated and troublesome in operation.

To compensate for the considerable force required to shift the four position valve in high pressure systems, the prior art have provided low pressure remote control systems for shifting the high pressure hydraulic valve between its four operating positions. A typical example is U.S. Pat. No. 3,106,135 wherein a double acting piston motor is connected to one end of the spool of the four position valve and operated by a four position low pressure valve. Although reducing the manual force needed to control a high pressure four position hydraulic valve, these systems generally require specially designed remote control valves.

A more economical control of the high pressure hydraulic system is by use of a pneumatic control. One approach of the prior art has been to use an air cylinder controlled by a pneumatic valve. Such a system is illustrated in FIG. 2 of U.S. Pat. No. 3,641,876. This method of stroking a hydraulic cylinder, although reducing lever effect and linkage, requires cost and time consuming insulation because of the need to precisely regulate the stroke of the air cylinder. Similarly, the use of an air cylinder increases the cost of the overall control system and thus makes it an uneconomic solution. Other approaches to using pneumatic control of hydraulic valves have included a diaphragm connected to the end of the hydraulic valve and attached as part of the casing of the valve. The pressure on the diaphragm is remotely controlled. Although removing expense of an air cylinder, the diaphragm has not been effectively used in high pressure hydraulic valves. Similarly, their useful life is less than that of other types of controls.

Hydreco, a unit of General Signal Corporation and assignee of the subject invention, has made an air shifted hydraulic valve which overcomes many of the problems of the prior art. Unfortunately, the latter valve requires an expensive, non-standard air valve having three outlet ports, i.e., a port corresponding to the raise, lower, and float positions of the hydraulic power spool. The raise port provided an air signal operating on one end of the hydraulic power spool to move it to a raised position and the lower port provided an air signal operating on the other end of the power spool to move it to a lowered position. The float port provided an air signal operating on a piston extending from the same end of the power spool as the lower signal apertures to move the power spool to a float position between the neutral and the lower position. Besides requiring an expensive, non-standard air valve, this system by not being able to have the hydraulic power spool assume automatically the float position after the power down has the same problems of a non-float position system.

The use of standard three-position, two-outlet port air valves have been limited to controlling three-position hydraulic valves as exemplified by U.S. Pat. No. 4,182,534. This patent provides signals on opposite ends of the hydraulic power spool in combination with a centering spring. Another three-position, two-outlet port pilot valve operating on a single end of a three-position hydraulic power spool is illustrated in U.S. Pat. No. 3,939,870. As mentioned previously, three position hydraulic spools, even if air assisted, are undesirable in certain applications.

Thus, there exists a need for a high pressure hydraulic valve which may be pneumatically controlled using a minimum amount of specially designed elements.

SUMMARY OF THE INVENTION

An object of the present invention is to provide an improved pneumatic control of a high pressure hydraulic valve.

Another object of the present invention is to provide pneumatic control of a high pressure hydraulic valve using standard parts.

A further object of the invention is to provide pneumatic control for a four position high pressure hydraulic valve using a standard two port, three position air valve.

Still another object of the present invention is to adapt a standard four position hydraulic valve for pneumatic controls using standard parts and a minimum amount of modification.

An even further object of the present invention is to provide an economical pneumatic assisted four position hydraulic valve which will minimize the attention needed by an operator to place the power spool in the float position.

These and other objects are attained by enclosing the ends of the power spool of a four position hydraulic valve with caps connected to the body of the valve to create air tight chambers thereabout. A detent is provided in one of the end caps and includes a shaft having sections of two diameters connected by a chamfered surface and radially biased catch to retain the power spool in the float position as it returns from a second power position to the hold position by engaging the chamfered surface. A centering spring, also in the end cap, biases the power spool of the hydraulic valve from the first and second power position toward the hold and neutral position. The pneumatic chambers are connected by a pilot port in each chamber to a pressurized air source by a three position, two outlet manually operated air valve. In the neutral position of the air valve, both pneumatic chambers are exhausted. In a first drive position of the air valve, one of the pilot ports is connected to the pressure source while the other is exhausted and in the other drive position of the air valve, the other pilot port is connected to the pressurized air source while the other pilot port is exhausted. The air valve being a standard part generally includes a centering spring.

Other objects, advantages and novel features of the present invention will become apparent from the following detailed description of the invention when considered in conjunction with the accompanying drawings.

BRIEF DESCRIPTION OF THE DRAWINGS

FIG. 4 is a crossectional view of a four position hydraulic valve incorporating the principles of the present invention with the power spool in the lower position.

FIG. 5 is a crossectional view of hydraulic cylinder incorporating the principles of the present invention with the power spool in the float position.

DESCRIPTION OF THE PREFERRED EMBODIMENTS

Figure 1:
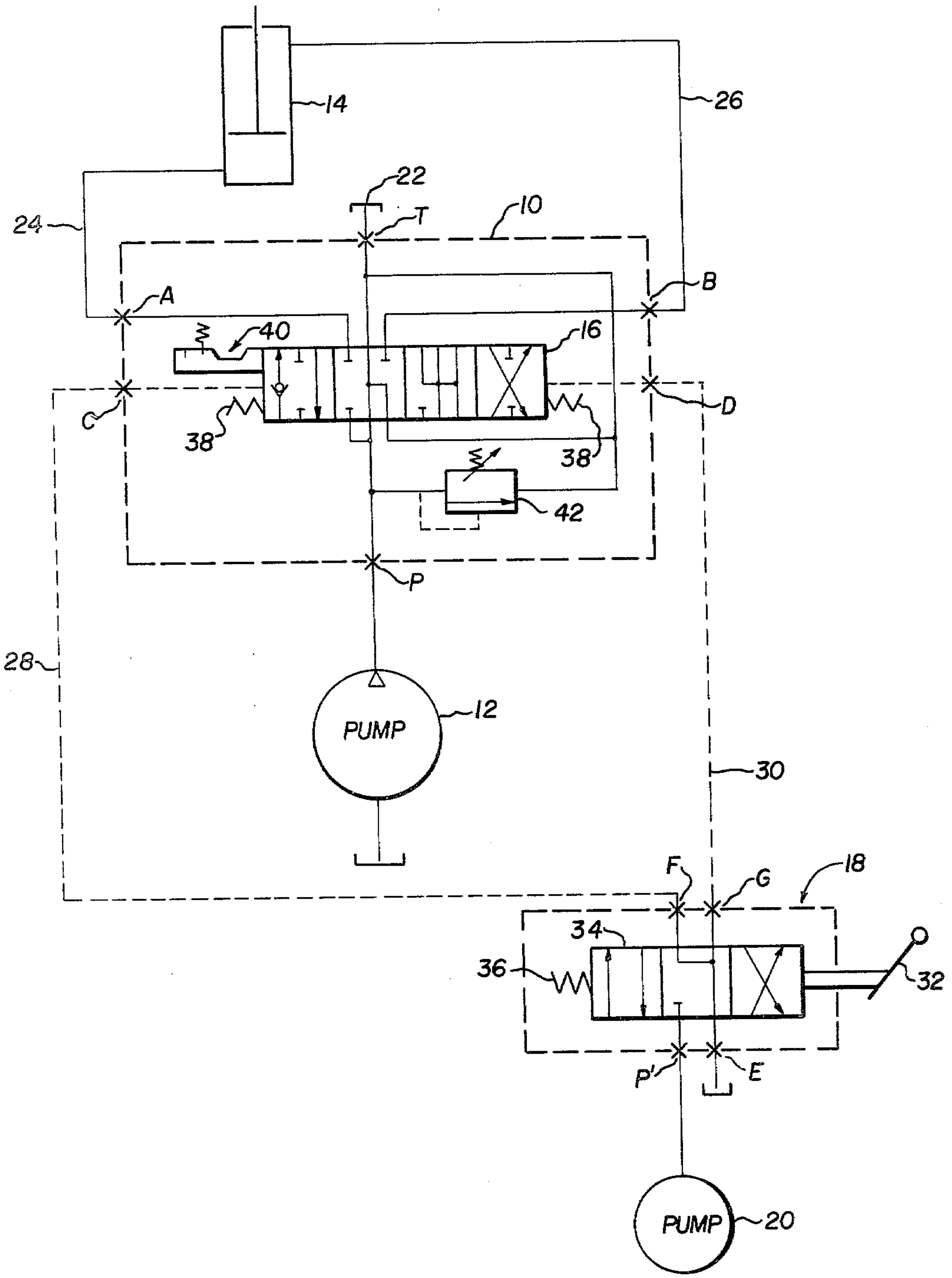
FIG. 1 is a schematic diagram of a hydraulic system with pneumatic controls incorporating the principles of the present invention.

A fluid control system to which the present invention applies includes a four position hydraulic valve 10 interconnecting a pump for hydraulic fluid 12 and a double acting motor or cylinder 14. The position of the power spool 16 of the hydraulic valve 10 is pneumatically controlled by a manually operable three position air valve 18 connected to an air pump 20. The hydraulic pump is connected to the outlet T of valve 10. A first work port A of the hydraulic valve 10 is connected by conduit 24 to one side of the fluid motor or cylinder 14 and a second work port B is connected by conduit 26 to the other side of the fluid motor or cylinder 14. Pilot ports C and D at the opposite ends of the power spool 16 of hydraulic valve 10 are connected to the two work ports F & G of air valve 18 by conduits 28 and 30, respectively. The pneumatic pump 20 is connected to inlet P of the air valve 18 and the outlet E is open to atmosphere to allow exhaust of the pneumatic system. The position of the spool 34 of the air valve 18 is controlled by the manual lever 32 and centering spring 36 in combination.

With the air valve 18 in the neutral position, the pilot ports C and D of the hydraulic valve 10 are connected to atmosphere and exhausted. This is accomplished by a closed center air valve. With no pressure applied to C and D, the power spool 16 of hydraulic valve 10 is maintained in the neutral or hold position by centering spring 38. In the neutral position, the work ports A and B to opposite sides of the cylinder 14 are closed thereby locking the cylinder 14 in a fixed position. The high pressure inlet P is connected to the outlet T.

To raise the implement connected to the cylinder 14, the operator manually manipulates handle 32 to position the air valve spool 34 to a first drive position interconnecting the pneumatic pump 20 to pilot port C of hydraulic valve 10 and simultaneously connecting the pilot port D of hydraulic valve 10 to the exhaust or atmosphere at outlet E. The pneumatic pressure at pilot port C of the hydraulic valve position moves the power spool 16 to a first power position interconnecting the pump 12 to work port A and connecting work port B to the outlet T. This will provide hydraulic pressure in line 24 to one side of the double acting cylinder 14 to raise the implement while the other side of the cylinder is drained via line 26. Upon release of the handle 32, the spool 24 of air cylinder 18 returns to its neutral position by centering spring 36 exhausting both pilot ports C and D of hydraulic valve 10. With the removal of the pneumatic drive signal at pilot port C, the centering spring 38 will return the power spool 16 of hydraulic valve 10 to the neutral or hold position thereby locking the cylinder 14 in a raised position.

To lower the implement, the operator moves handle 32 in the opposite direction forcing the spool 34 of the air valve 18 to the second drive position which connects the pneumatic pump 20 to pilot port D of hydraulic valve 10 and interconnecting pilot port C of hydraulic valve 10 to the atmosphere. This provides a pneumatic pressure signal at the opposite end of power spool 16 of the hydraulic valve 10 moving it in the opposite direction of that for the raised position of the spool. Once the power spool 16 has reached the lower position, the hydraulic pump 16 is connected to work port B to provide hydraulic pressure at the opposite end of cylinder 14 via line 26 to drive the implement in the opposite direction and thereby lower it. The opposite end of the cylinder 14 is connected to the outlet T via line 24 and work port A to allow removal of the hydraulic fluid at the opposite end of the cylinder. As long as the operator maintains the air valve 18 in the lowered drive position, power spool 16 of hydraulic valve 10 will be maintained in the lowering or second power position. Once the operator releases the handle 32, the spool 34 of air valve 18 will return to the neutral position exhausting both pilot ports C & D of the hydraulic valve 10. The power spool 16 is then urged in the opposite direction by centering spring 38 back toward the neutral or hold position of the power spool 16.

A detent 40 is provided to maintain the power spool 16 at a float position which is located between the second power position or a lower position and the neutral and hold position. In the float position, the work ports A and B and consequently both sides of the work cylinder 14 are interconnected and connected to the outlets T. This allows the cylinder 14 to float or lower itself under the weight of gravity. To overcome the detent 40 and return the power spool 16 from the float position to the neutral position, the operator using handle 32 moves the air valve spool 34 to the raised position to provide a pneumatic signal at pilot port C. Once this pneumatic signal at pilot port C has overcome detent 40, the centering spring 38 assist in moving the power spool 16 to the neutral or hold position. Once the power spool 16 is in the neutral or hold position, cylinder is locked at a lowered position. A relief valve 42 provides a direct connection of the high pressure inlet P to the outlet bypassing the power spool.

Although the fluid system of FIG. 1 has been described as including a hydraulic motor or cylinder 14 for raising and lowering loads, it is to be understood that the present system relates equally to horizontal motors and thus the raise and lower position of power spool 16 represent two opposite power positions to drive a fluid motor. The hydraulic valve 10 is capable of carrying high pressure fluid rates up to 150 gallons per minute. At fluid rates of approximately 100 gallons per minute, the pneumatic power system of the present invention is most effective. Hydraulic valve 10 is a standard hydraulic valve modified for pneumatic control and float detent and air valve 18 is a standard three position air valve. By separating the hydraulic valve and its position control into two distinct systems, the cost of the system is reduced without affecting the efficiency. Hydraulic valve 10 includes two service ports P and T and two work ports A and B. With the standard configuration it is more acceptable to the end user. The additional pilot ports C and D are usually connected to the two work ports F and G of the air valve 18 which also include two service ports P and E. By using equipment having standard configuration, it is more acceptable to end user and readily connected in the desired configuration presented in FIG. 1.

Figure 2:
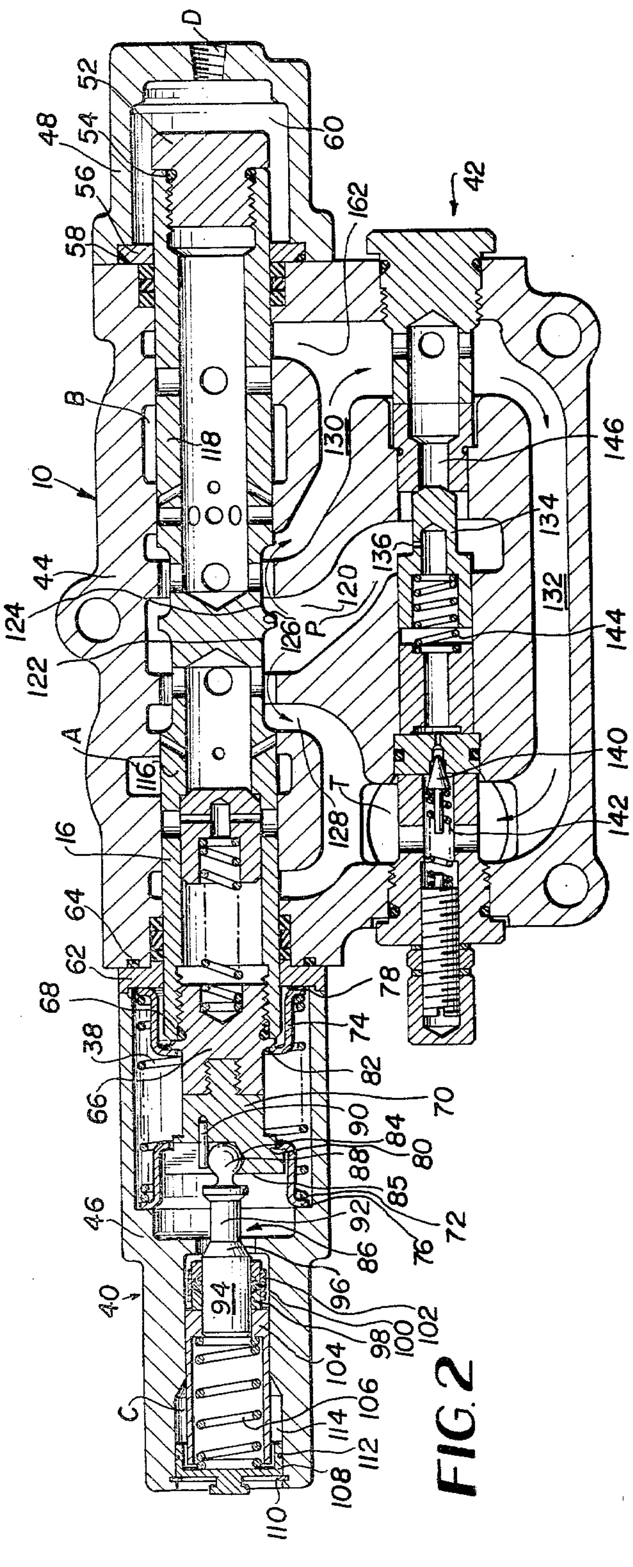
FIG. 2 is a crossectional view of a four position hydraulic valve incorporating the principles of the present invention with the power spool in the neutral position.
Figure 6:
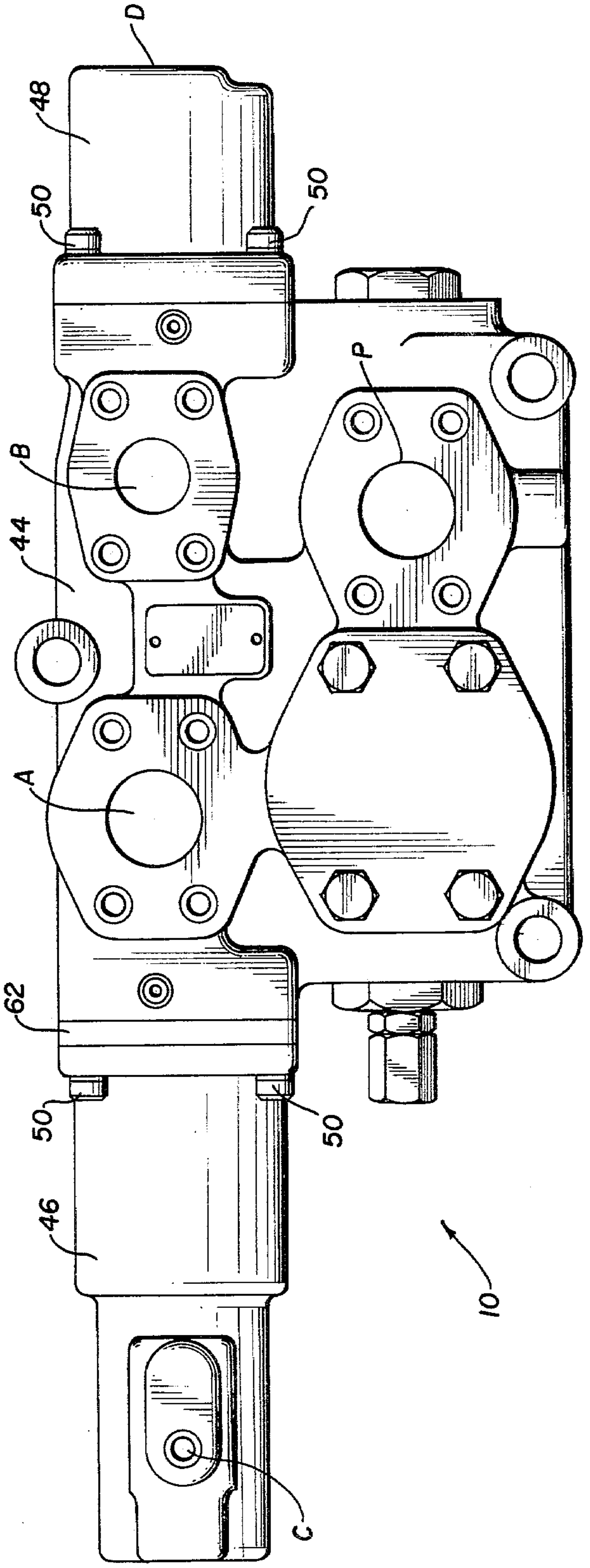
FIG. 6 is a side view of a hydraulic valve incorporating the principles of the present invention.

The hydraulic valve 10 is illustrated in detail in FIGS. 2 through 6 and includes a housing 44 with the power spool 16 extending from both ends thereof. End caps 46 and 48 are secured to the housing 44 by fasteners 50, as shown in FIG. 6, and enclose the ends of power spool 16 in air tight chambers. The right end of the power spool 16, as illustrated in FIG. 2, is sealed by a plug 52 threadily secured thereto and O-ring 54.

A disc or face seal 56 in combination with O-ring 58 seals the mounting of end cap 48 to the housing 44 to create an air tight chamber 60. Pilot port D is shown in the end of end cap 48 to provide access to the interior air chamber 60. Thus, a pneumatic signal through pilot port D will act on the end of the power spool 16 driving it to the left as illustrated in the figures.

The other end or the left end of the power spool 16 is enclosed by end cap 46 which is joined to the housing or body 44 with a collar 62. An O-ring 64 in the face of the housing provides a seal between the collar and the housing. The end cap 46 includes the centering spring 38 and detent 40. The left end of the spool 16 is closed by a plug 66 threadily secured thereto and an O-ring 68. A detent adapter 70 is threadily mounted to the plug 66. A pair of spring holders 72 and 74 confine the centering spring 38. In the neutral position illustrated in FIG. 2, the spring holders 72 and 74 are at rest at one end against interior shoulder 76 of end cap 46 and land 78 of the collar 62, respectively. The other end of spring holders 72 and 74 engage a shoulder 80 of detent adapter 70 and a shoulder 82 of plug 66, respectively. As will be evident in the description of the raise, lower and float positions of the power spool 16, the spring holder 72 follows the power spool to the right whereas spring holder 74 follows the power spool in movement to the left. In any move of the power spool from the neutral or hold position, the spring holders 72 and 74 will place centering spring 38 under compression. The centering spring 38 is generally not strong enough to overcome the pneumatic signals at ports C and D, but once they are removed, it will bias or urge the power spool 16 back toward the neutral or hold position.

In the face of detent adapter 70 is a recess 84. A detent shaft 86 includes a ball and portion 88 which lies in recess 84 and is held therein by pin 90. The detent shaft 86 includes a first smaller diameter section 92 connected to a larger diameter section 94 by a chamfered section 96. A race 98 encompasses the detent shaft 86 and retains detent balls 100. A compression ring 102 radially biases the race 98 and detent balls 100 against the surface of detent shaft 86. The race 98, detent balls 100 and compression ring 102 form the catch portion of the detent 40. As will be explained more fully below, the detent balls 100 ride along the surfaces 92, 94 and 96 and lock the power spool 16 in the float position by engaging the chamfered surface of portion 96 for a left to right movement from the lowered position of the spool 16.

The detent shaft 86 slides within a bore in sleeve 104. A spring 106 is held between an interior shoulder of sleeve 104 and end seal plate 108 which is held in place by snap ring 110 and includes an O ring 112 for an air tight seal. The pilot port C is in the enlarged interior diameter 114 of the end cap 46. Pneumatic pressure signals applied to pilot port C position the power spool 16 to the right by applying pressure to the detent shaft 86.

The elements 46 through 114 are modifications added to a standard hydraulic valve 10 to permit pneumatic control of the position of the power spool 16. These generally include enclosing the two ends of the power spool in air tight chambers, a centering spring and a detent for the float position. Since the remainder of the hydraulic valve 10 is well known and is considered a part of the prior art, they will not be described except in the operational description of the positions and fluid paths of FIG. 2 through 5. Although a specific valve structure will be described, it is only an example and other hydraulic valves may be used. The essence of the present invention being the adaptation of a hydraulic valve to allow pneumatic control thereof and a detent for the float position without using a specially designed valve with no interior modifications.

In the neutral or hold position illustrated in FIG. 2, the work port A is sealed or blocked by portion 116 of power spool 16 and work port B is sealed or blocked by portion 118 of power spool 116. The high pressure well 120 connected to the pressure inlet P is connected to flow to the outlet T via recesses 122 and 124 on opposite sides of central land 126 of the power spool 116. The flow of the hydraulic fluid, as illustrated by arrows, is from the high pressure well 120 to the outlet T.

A pressure relief valve 42 is shown in the bottom of the housing 44 interconnecting the high pressure well 120 and outlet T by passing the power spool 16. The fluid under pressure from well 120 will enter valve poppet 134 through opening 136. If the fluid pressure is above designed it will drive the pilot poppet 140 back against spring 142 allowing a small amount of the fluid to flow directly into the outlet T. If the excess pressure should persist, the valve poppet 134 will move left against spring 144 to open the passage 146 to provide a larger flow into passage 132 to the outlet T. As with the valve, the check valve 42 is but an example of the type of check valve which may be used to relieve over pressure in the high pressure inlet well 120 so as to bypass the valve structure and be connected to the outlet T.

Figure 3:
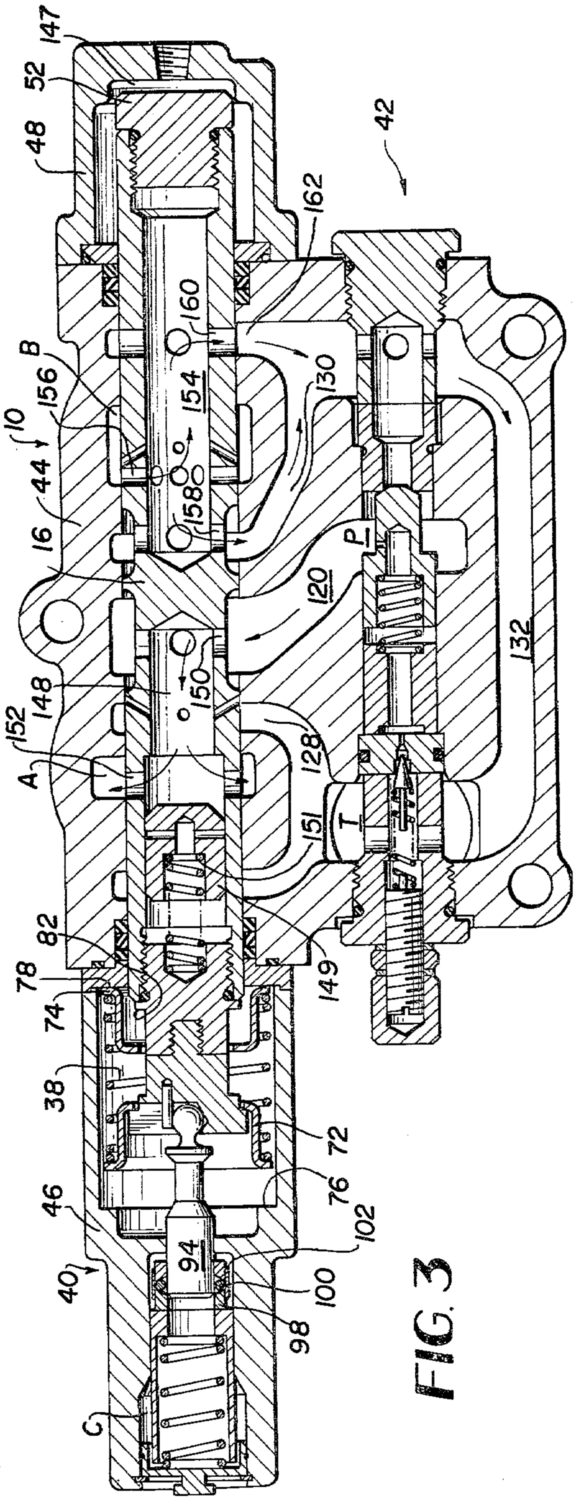
FIG. 3 is a crossectional view of a four position hydraulic valve incorporating the principles of the present invention with the power spool in the raised position.

To place the spool in the raised position illustrated in FIG. 3, a pneumatic signal or pressure is applied to pilot port C which forces the detent shaft 86 and the power spool 16 to the right. With the motion to the right, the spring holder 72 is pulled by shoulder 80 of detent adapter 70 from the shoulder 76 of the end cap 46, placing the centering spring 38 under compression. It should be noted that one end of spring holder 74 remains in contact with land 78 while shoulder 82 of end plug 66 moves out of engagement with the other end. The extreme rightward movement of power spool 16 is limited by plug 52 engagins face 147 of end cap 48. With the power spool 16 in the raised position, the high pressure well 120 is connected to the work port A by internal bore 148 of power spool 16 and orifices 150 and 152. The other work port B is connected to the outlet T by internal bore 154 in power spool 116 and orifices 156, 158 and 160. The bore 148 is connected to the orifice 152 when the pressure is sufficient to drive poppet 149 back against poppet spring 151. When the pressure decreases, the spring 151 will drive poppet 149 back to the right to close off the bore 148 and orifice 152. Thus, the poppet 148 is a check valve.

Orifices 158 and 160 empty into paths 130 and 162, respectively which is connected to the outlet T by a common path 132. Once the pneumatic signal or pressure at port C is removed, the centering spring 38 forces the power spool 116 back to the left and into the neutral position or hold position illustrated in FIG. 2. In the neutral and the raised positions of FIGS. 2 and 3, respectively, the detent balls 100 engage the larger diameter portion 194 of the detent shaft 86 and have to affect on the movement of the power spool 16.

For the lower position illustrated in FIG. 4, a pneumatic pressure signal is applied to pilot port D driving the power spool 16 to the left. The leftward movement of power spool 16 is limited by face 85 of detent adapter 70 engaging face 165 of end cap 46. A chamfered surface 164 engages the edge of race 98. Spring 166 absorbs the pressure applied to the race 98 and sleeve 104. As the power spool 116 moves from the neutral position left toward the lower position, the detent balls 100 ride along surface 94 down chamfered surface 96 and onto the smaller diameter surface 92. Spring holder 74 pulled at one end by shoulder 82 of plug 66 disengages land 78 at its other end, placing the centering spring 38 under compression. Spring holder 72 at one end disengages shoulder 80 of detent adapter 70 while the other end remains in place and in contact with shoulder 96 of the end cap 46.

With the power spool 16 in the lower position illustrated in FIG. 4, the high pressure well 120 is connected to work port B via internal bore 154 and orifices 158 and 160. The work port A is connected to the outlet T via orifice 150, bore 148 and recess 122 into passage 128. It should be noted that if the orifices are not sufficient to accomodate the drain rate through work port A, check valve 149 may open, allowing additional fluid to flow from bore 148 into passage 168 and onto the outlet T. Generally this will not be needed since the diameters of sizes of orifices 150 are equal to or greater than orifices 160 and consequently can accommodate at least the exhaust of fluid from one side of a double acting cylinder as to the driving fluid on the other side. As long as a pneumatic pressure signal is applied to pilot port C, the power spool 16 will remain in the lower position as illustrated in FIG. 4.

Once the pneumatic signal or pressure is removed from pilot port D, the centering spring 38 begins to move the power spool 16 to the right until detent balls 100 engage chamfered surface 96 on the detent shaft 86. The centering spring 38 does not have sufficient force to move the power spool 16 and the detent shaft 86 further to the right to overcome the radial compression forces of compression ring 102 of the detent catch assembly. The detent thus locks power spool 16 in the float position illustrated in FIG. 5.

In the float position, the high pressure well 120 is connected to the outlet T via orifice 158, bore 154, orifice 156, passage 130 and 132, as well as via recess 122 and passage 128. Work port A is connected to the outlet T via recess 122 and path 128. Work port B is connected to the outlet T via orifice 160, bore 154, orifice 156 and passages 130 and 132. Thus, in the float position, the two work ports, A and B, are connected to the outlet T. Similarly, the high pressure well 120 is also connected to the outlet T. In order to move the power spool 16 out of the float position, a pneumatic signal is applied at pilot port C to drive the spool 16 to the right with sufficient force to overcome the detent catch assembly including race 98, balls 100 and compression ring 102. This will cause the detent balls 100 to rise up over chamfered portion 96 and onto the larger diameter portion 94 of detent shaft 86. Only a short pneumatic signal is needed at port C since once the detent balls 100 ride off chamfered portion 96 and onto the larger diameter portion 94 of the detent shaft 86 the centering spring 38 will take over to position the power spool 16 into the neutral or hold position illustrated in FIG. 2.

From the preceding of the preferred embodiment, it is evident that the objects of the invention are attained in that a pneumatically controlled hydraulic valve is provided with no internal modifications of the valve and minor modifications to the end of the power spool. By use of a detent and centering spring as well as specific end caps, a standard three position air valve may be used to achieve four position control of the hydraulic valve. Although the invention has been described and illustrated in detail, it is to be clearly understood that the same is by way of illustration and example only and is not to be taken by way of limitation. The spirit and scope of this invention are to be limited by the terms of the appended claims.

What is claimed:

1. A fluid control system for a fluid operated motor comprising:

a hydraulic valve including an inlet for receiving fluid under pressure from a pump, first and second work ports adapted to be contacted to a fluid operated motor, a return outlet, a power spool means for selectively establishing communication (a) between said inlet and one work port and between the other work port and said return outlet at a first power position; (b) between said inlet and said other work port and between said one work port and said return outlet at a second power position; (c) between said inlet, said return outlet and both work ports simultaneously at a float position, and (d) no communication to or between said work ports at a hold position, first and second pilot ports communicating with said power spool means for receiving pressurized pilot fluid to move said power spool in opposite axial directions, detent means for maintaining said power spool in said float position after said second power position upon cessation of said pressurized pilot fluid at said first pilot port until overcome by pressurized pilot fluid at said second pilot port, and return means for positioning said power spool (a) to said hold position after said first power position, (b) to said float position after said second power position, and (c) to said hold position after said detent is overcome; and a low pressure pilot valve including an inlet for receiving fluid under pressure from a pump, first and second work ports connected to said first and second pilot ports of said hydraulic valve respectively, an outlet, spool means for selectively establishing communication (a) between said inlet and one work port and between said outlet and the other work port at a first drive position, (b) between said inlet and said other work port and between said outlet and said one work port at a second drive position, (c) between said outlet and both said first and second work ports at a neutral position, and return means for positioning said spool in said neutral position after said first and second drive positions.

2. The fluid control system according to claim 1 wherein said return means of said hydraulic valve includes a centering spring mounted on one end of said power spool adjacent said second pilot port, said detent means is mounted on said one end of said power spool, and said centering spring is not sufficient to overcome said detent means without fluid pressure at said second pilot port.

3. The fluid control system according to claim 1 wherein said pilot valve is a pneumatic valve providing pneumatic pressure to the pilot ports of said hydraulic valve.

4. The fluid control system according to claim 1 wherein said first and second pilot ports are adjacent opposite ends of said power spool.

5. The fluid control system according to claim 1 wherein said hydraulic valve is capable of interconnecting flow rates up to 120 gallons per minute.

6. In a fluid control system including a hydraulic valve with a power spool having a hold position, a first power position on one side of said hold position, a second power position on the other side of said hold position and a float position between said second power position and said hold position, the improvement comprising:

a first and second cap means mounted to the body of said hydraulic valve and encompassing first and second ends respectively of said power spool which extends from said body for creating an air tight chamber about said first and second ends of said power spool, respectively;

first and second pneumatic ports in said first and second cap means respectively for providing access to said chamber by a pneumatic pressure source which imposes position changing force on said power spool;

centering means in said first cap means for biasing said power spool to said hold position;

a detent shaft mounted to said first end of said power spool, said detent shaft having a first portion of a first outside diameter, a second portion of a second outside diameter smaller than said first outside diameter and a chamfer portion interconnecting said first and second portions, said second portion having a length at least equal to the distance of travel of said power spool between said float position and said second power position; and a catch means radially biased to contact said detent shaft as said detent shaft traverses said catch means axially for retaining the power spool in said float position after said second power position by engaging said chamfer portion.

7. The fluid control system according to claim 6 wherein said catch means includes a plurality of balls in a race and a compression ring encompassing said race and biasing said balls towards said detent shaft.

8. The fluid control system according to claim 6 wherein said air tight chamber in said first cap means encompasses the end of said shaft not connected to said power spool so that said position changing force from pneumatic pressure at said first pneumatic port is via said shaft.

9. The fluid control system according to claim 6 including:

a source of pneumatic pressure;

a three position pneumatic valve for interconnecting said power source to a first outlet at a first drive position, interconnecting said power source to a second outlet at a second drive position and uniting said first and second outlets in a neutral position;

said first outlet is connected to said first pneumatic port of said first cap means to provide pneumatic pressure to move said power spool from said hold position to said first power position and from said float position to said hold position; and said second outlet is connected to said second pneumatic port of said second cap means to provide pneumatic pressure to move said power spool from said hold position to said second power position.

10. The fluid control system according to claim 6 wherein said centering means is insufficient to move said shaft when said catch means engages said chamfer.

* * * * *